(12) United States Patent
Kimura

(10) Patent No.: US 7,879,932 B2
(45) Date of Patent: Feb. 1, 2011

(54) POLYOLEFIN RESIN COMPOSITION

(75) Inventor: Kenji Kimura, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 666 days.

(21) Appl. No.: 11/059,328

(22) Filed: Feb. 17, 2005

(65) Prior Publication Data

US 2005/0187319 A1 Aug. 25, 2005

(30) Foreign Application Priority Data

Feb. 20, 2004 (JP) .............................. 2004-043995

(51) Int. Cl.
*C08K 5/15* (2006.01)
*B60C 1/00* (2006.01)
*B29C 47/00* (2006.01)

(52) U.S. Cl. ........................ 524/107; 524/114; 524/570; 524/582

(58) Field of Classification Search ................. 524/110, 524/119, 120, 141, 153, 117, 430, 107, 582, 524/570, 114; 252/389.23, 389.24, 291; 525/112, 120, 132, 133, 149, 100, 103, 128; 264/165, 239

See application file for complete search history.

(56) References Cited

U.S. PATENT DOCUMENTS

| | | | | |
|---|---|---|---|---|
| 6,066,695 | A * | 5/2000 | Roth et al. | 525/101 |
| 6,437,048 | B1 * | 8/2002 | Saito et al. | 525/240 |
| 6,465,548 | B1 * | 10/2002 | Inoue et al. | 524/110 |
| 2002/0065342 | A1 * | 5/2002 | Kishiro et al. | 524/117 |
| 2004/0152818 | A1 * | 8/2004 | Iwashita | 524/430 |
| 2004/0171729 | A1 * | 9/2004 | Iwashita | 524/430 |

FOREIGN PATENT DOCUMENTS

| | | | |
|---|---|---|---|
| JP | 2002-212347 | | 7/2002 |
| WO | WO02096960 | * | 12/2002 |
| WO | WO02096986 | * | 12/2002 |

OTHER PUBLICATIONS

Kimura, Kenji et al., "New Stabilizer Solution for Polypropylene Fiber", *SPE Polyolefins 2005, The International Conference on Polyolefins*, Feb. 27-Mar. 2, 2005, 6 pages.

* cited by examiner

*Primary Examiner*—Basia Ridley
*Assistant Examiner*—Alexander C Kollias
(74) *Attorney, Agent, or Firm*—Foley & Lardner LLP

(57) ABSTRACT

There are disclosed a polyolefin resin composition, containing (A) an organic peroxide, (B) a phosphorous type anti-oxidant of formula (I):

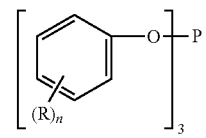

wherein R represents $C_{1-8}$ alkyl, $C_{5-8}$ cycloalkyl, $C_{6-12}$ alkylcycloalkyl, $C_{7-12}$ aralkyl, or phenyl, (C) anti-oxidant of formula (II):

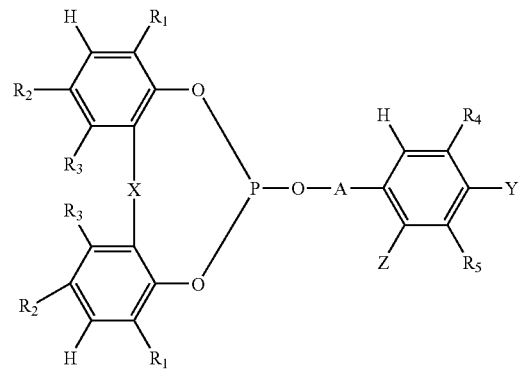

wherein $R_1$, $R_2$, $R_4$ and $R_5$ independently represent hydrogen, $C_{1-8}$ alkyl, or the like, $R_3$ represents hydrogen, $C_{1-8}$ alkyl, X represents a single bond, sulfur atom, or the like, and (D) polyolefin resin, and wherein the amounts of (B) phosphorous type anti-oxidant of formula (I) and (C) anti-oxidant of formula (II) each is 0.001 to 1 part per 100 parts by weight of the total amount of (A) and (D), and a production process thereof.

2 Claims, No Drawings

POLYOLEFIN RESIN COMPOSITION

FIELD OF THE INVENTION

The present invention relates to a polyolefin resin composition.

BACKGROUND OF THE INVENTION

Polyolefin resins have versatile utility as the materials for packaging, unwoven fabrics, container, automobile or home electric appliances because of their good appearances, mechanical strength, anti-chemical properties, or suitability for packaging, and are typically melt-kneaded at about 150 to 300° C. by using an extruder to form pellets, and then they were processed into various articles, which were in many cases used for a long period of time, and the melt flow property of such pellets was adjusted according to the use of the articles, for example, by adding organic peroxides. JP2002-212347A discloses, at paragraphs 163 to 164, column 40, propylene-ethylene random copolymer resins containing, 2,4,8,10-tetra-t-butyl-6-[3-(3-methyl-4-hydroxy-5-t-butyl-phenyl)propoxy]dibenz[d,f][1,3,2]dioxaphosphepin, tetrakis (2,4-di-t-butylphenyl)-[1,1-biphenyl]-4,4'-diylbisphosphonite and 2,5-dimethyl-2,5-bis(t-butylperoxy)hexane and having processing stability and coloring resistance.

DETAILED DESCRIPTION OF THE INVENTION

Polyolefin resin compositions and articles processed from the composition according to the present invention show long-term stability, that is, better anti-oxidation property, and also better initial color just after processed.

An aspect of the invention relates to a polyolefin resin composition, comprising
(A) an organic peroxide,
(B) a phosphorous type anti-oxidant of formula (I):

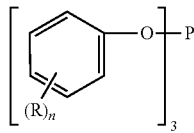

wherein R represents $C_{1-8}$ alkyl, $C_{5-8}$ cycloalkyl, $C_{6-12}$ alkylcycloalkyl, $C_{7-12}$ aralkyl, or phenyl, and
n is an integer of 0 to 2, provided that when n=2, two R groups may be the same or different,
(C) anti-oxidant of formula (II):

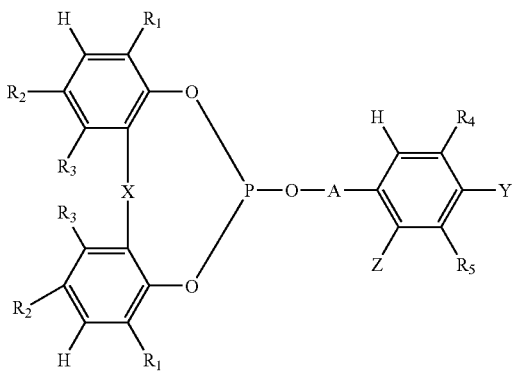

wherein $R_1$, $R_2$, $R_4$ and $R_5$ independently represent hydrogen, $C_{1-8}$ alkyl, $C_{5-8}$ cycloalkyl, $C_{6-12}$ alkylcycloalkyl, $C_{7-12}$ aralkyl, or phenyl,
$R_3$ represents hydrogen, $C_{1-8}$ alkyl,
X represents a single bond, sulfur atom, or —$CHR_6$—,
$R_6$ represents hydrogen, $C_{1-8}$ alkyl, or $C_{5-8}$ cycloalkyl,
A represents $C_{2-8}$ alkylene, or a group of formula:
*—$COR_7$—, wherein $R_7$ represents a single bond or $C_{1-8}$ alkylene, and the bond indicated by * means that said bond is connected with the phosphite oxygen atom in formula (II),
either one group of Y and Z represents hydroxyl group, $C_{1-8}$ alkoxy, or $C_{7-12}$ aralkyloxy, and the other group represents hydrogen or $C_{1-8}$ alkyl, and
provided that when Y is hydroxyl one of $R_4$ and $R_5$ represents $C_{3-8}$ alkyl, $C_{5-8}$ cycloalkyl, $C_{6-12}$ alkylcycloalkyl, $C_{7-12}$ aralkyl or phenyl, and
two $R_1$ groups, two $R_2$ group and two $R_3$ groups each may be the same or different, and
(D) polyolefin resin,
and wherein the amounts of (B) phosphorous type anti-oxidant of formula (I) and (C) anti-oxidant of formula (II) each is 0.001 to 1 part per 100 parts by weight of the total amount of (A) and (D).

Another aspect of the invention relates to a process for producing the polyolefin resin composition above, which comprises mixing the phosphorous type antioxidant of formula (I), the anti-oxidant of formula (II), the organic peroxide and the polyolefin resin, wherein the amounts of the phosphorous type anti-oxidant of formula (I) and (C) anti-oxidant of formula (II) each is 0.001 to 1 part per 100 parts by weight of the total amount of the organic peroxide and the polyolefin resin, and melt-kneading the resulting mixture.

Examples of the polyolefin resin include, for example,
(1) polyethylene, for example, high-density polyethylene (HD-PE), low-density polyethylene (LD-PE) and linear low-density polyethylene (LLDPE)
(2) polypropylene
(3) methylpentene polymer
(4) EEA (ethylene/ethyl acrylate copolymer) resin
(5) ethylene/vinyl acetate copolymer resin
(6) ethylene/propylene co-polymer
(7) ethylene/vinyl acetate copolymer, and
(8) cyclic polyolefin.

Preferred polyolefin is homo-polypropylene, hereinafter referred to as B1, polypropylene(co-polymer) obtained by block copolymerization, and polypropylene(co-polymer or terpolymer) obtained by random co-polymerization, The polyolefin are not specifically limited. For example, they may be those obtained by radical polymerization or those produced by the polymerization using a catalyst containing a metal of Group IVb, Vb, VIb or VIII of the Periodic Table.

The catalyst containing such a metal may be a metal complex which is coordinated by one or more ligands, for example, oxide which is coordinated by a π- or σ-bond, halogenated compound, alcoholate, ester, aryl and the like, and these complexes may be used as it is, or a base material such as magnesium chloride, titanium chloride, alumina, silicon oxide, etc. may carry the complexes.

As the polyolefin, for example, there are preferably used those produced by using Ziegler-Natta catalyst, metallocene catalyst, Phillips catalyst and the like.

Examples of the organic peroxide include, for example, peroxy alkyls such as dicumyl peroxide, di-t-butyl peroxide, di-t-butylcumyl peroxide,
2,5-dimethyl-2,5-di(tert-butylperoxy)hexane,
2,5-dimethyl-2,5-di(benzoylperoxy)hexene,
1,3-bis(t-butylperoxyisopropyl)benzene, or 3,6,9-triethyl-3,6,9-trimethyl-1,4,7-triperoxynonane;

diacyl peroxides such as benzoyl peroxide, lauroyl peroxide, decanoyl peroxide or the like;

peroxy esters such as 1,1,3,3-tetramethylbutyl peroxyneodecanoate, t-butyl peroxyneodecanoate, a-cumyl peroxyneodecanoate, t-butyl peroxyneoheptanoate, t-butyl peroxypivalate, t-hexyl peroxypivalate, 1,1,3,3-tetramethylbutyl peroxy-2-ethylhexanoate, t-amyl peroxy-2-ethylhexanoate, t-butyl peroxyisobutyrate, bis-t-butyl peroxyhexahydroterephthalate, t-amyl peroxy-3,5,5-trimethylhexanoate, t-butyl peroxyacetate, t-butyl peroxybenzoate, di-t-butyl peroxytrimethyladipate, or the like;

peroxy carbonates such as bis(3-methoxybutyl) peroxydicarbonate, bis(2-ethylhexyl) peroxydicarbonate, diisopropyl peroxydicarbonate, t-butylperoxy isopropyl carbonate, di(4-t-butylcyclohexyl) peroxydicarbonate, dicetyl peroxydicarbonate, dimyristyl peroxydicarbonate or the like.

Preferred is peroxyalkyl. Among the peroxyalkyl, particularly preferred are 2,5-dimethyl-2,5-bis(t-butylperoxy)hexane, hereinafter referred to as A1, 1,3-bis[(t-butylperoxy)isopropyl]]benzene and 3,6,9-triethyl-3,6,9-trimethyl-1,4-7-triperoxynonane.

The organic peroxide (A) is preferably blended with 100 parts by weight of the polyolefin resin in an amount of 0.0001 to 0.5 part by weight, more preferably 0.0005 to 0.3 part, and yet more preferably in a range of 0.001 to 0.1 part by weight. The addition of the organic peroxide within the prescribed ranges preferably imparts the resin with good processing stability, mechanical property and initial color.

The organic peroxide (A) may be added to polyolefin resin in a suitable amount, or a master batch prepared from the polyolefin resin powder and the organic peroxide (A) in a higher amount, by impregnating the latter in the former, may be suitably diluted with the polyolefin. The amount of the organic peroxide impregnated in the polyolefin is preferably 1 to 20 wt %.

Next descriptions are made to the definitions of $R_1$ to $R_7$, A, X, Y and Z, and preferred embodiments of the antioxidant of formula (II).

Examples of the $C_{1-8}$ alkyl represented by $R_1$, $R_2$, $R_3$, $R_4$, $R_5$, or $R_6$, Y or Z include, for example, methyl, ethy, propyl, i-propyl, butyl, i-butyl, sec-butyl, t-butyl, t-pentyl, pentyl, hexyl, heptyl, octyl, i-octyl, and t-octyl.

The $C_{1-8}$ alkyl moiety of the $C_{1-8}$ alkoxy group represented by Y or Z include, for example, the same groups as exemplified above.

Examples of the $C_{5-8}$ cycloalkyl represented by $R_1$, $R_2$, $R_4$, $R_5$, or $R_6$ include, for example, cyclopentyl, cyclohexyl, cycloheptyl, and cyclooctyl.

Example of the $C_{6-12}$ alkylcycloalkyl represented by $R_1$, $R_2$, $R_4$, $R_5$, or $R_6$ include, for example, methylcyclopentyl, 1-methylcyclohexyl, ethylcyclohexyl, propylcyclohexyl, butylcyclohexyl, pentylcyclohexyl, and hexylcyclohexyl.

Examples of the $C_{3-8}$ alkyl represented by $R_4$ or $R_5$ include, for example, propyl, butyl, pentyl, hexyl, heptyl and octyl.

Examples of the $C_{7-12}$ aralkyl represented by $R_1$, $R_2$, $R_4$, or $R_5$ include, for example, benzyl, phenethyl, phenylpropyl, naphthylmethyl, and naphthylethyl.

The $C_{7-12}$ aralky moiety of the $C_{7-12}$ aralkyloxy group represented by Y or Z include, for example, the same groups as exemplified above.

Examples of the $C_{2-8}$ alkylene represented by A include, for example, methylene, dimethylene, trimethylenene, tetramethylene, pentamethylene, hexamethylene, heptamethylene and octamethylene. Examples of the $C_{1-7}$ alkylene group represented by $R_7$ include, for example methylene and those groups exemplified above for $C_{2-8}$ alkylene groups.

$R_1$ and $R_2$ are preferably $C_{1-8}$ alkyl, $C_{5-8}$ cycloalkyl, or $C_{6-12}$ alkylcycloalkyl.

$R_4$ is preferably i-propyl, i-butyl, sec-butyl, t-butyl, t-pentyl, i-octyl, t-octyl, cyclohexyl, 1-methylcyclohexyl or 2-ethylhexyl.

$R_5$ is preferably hydrogen, $C_{1-5}$ alkyl such as methyl, ethyl, n-propyl, i-propyl, n-butyl, i-butyl, sec-butyl, t-butyl or t-pentyl.

$R_3$ is preferably hydrogen or $C_{1-5}$ alkyl.

X is preferably a single bond, sulfur, or methylene.

A is preferably propylene, *—CO—, or *—COCH$_2$CH$_2$—, wherein * means that the —CO— group is bonded with the oxygen atom of the phosphite oxygen atom.

Y is preferably hydroxyl group.

Z is preferably hydrogen or $C_{1-8}$ alkyl.

Also preferred are optional combinations among the preferred features above.

More preferred examples of the antioxidant (II) are, for example,

6-[3-(3-t-butyl-4-hydroxy-5-methylphenyl)propoxy]-2,4,8,10-tetra-t-butyldibenz[d,f][1,3,2]dioxaphosphepin, hereinafter referred to as C1, 6-[3-(3,5-di-t-butyl-4-hydroxyphenyl)propoxy]-2,4,8,10-tetra-t-butyldibenz[d,f][1,3,2]dioxaphosphepin, 6-[3-(3,5-di-t-butyl-4-hydroxyphenyl)propoxy]-4,8-di-t-butyl-2,10-dimethyl-12H-dibenz[d,g][1,3,2]dioxaphosphocin, and 6-[3-(3,5-di-t-butyl-4-hydroxyphenyl)propoxy]-4,8-di-t-butyl-2,10-dimethyl-12H-dibenz[d,g][1,3,2]dioxaphosphocin.

R is preferably $C_{3-8}$ straight, or branched alkyl in the phosphorous type antioxidant compound of formula (I). Preferred examples of the compound are tris(2,4-di-t-butylphenyl)phosphite, hereinafter referred to as D1, and tris(mono or dinonylphenyl)phosphite.

The polyolefin resin composition of the invention is typically prepared by the steps of mixing the organic peroxide (A), the phosphorous type anti-oxidant of formula (I), antioxidant of formula (II) and the polyolefin resin (D) in the weight amount ratio as defined above, and melt-kneading the resulting mixture. Preferably, 10 to 500 parts by weight of the compound of formula (I) is used per 100 parts by weight of the compound (II), more preferably 20 to 200 parts by weight of the compound of formula (I) is used per 100 parts by weight of the compound (II), particularly for balancing the antioxidant property and initial color of the polyolefin resin composition. The melt-flowing properties can also be suitably adjusted in the present composition.

The polyolefin resin composition may comprise further agent(s), for example, at least one agent selected from the group consisting of other antioxidant agents, anti-blocking agents, light-stabilizers, lubricants, anti-static agents, and pigments, if necessary These additional agent or agents may be uniformly mixed with the components (A) to (D) by a mixer such as Henschel-mixer or Super-mixer, and then melt-kneaded by a mono-axis, or multi-axis extruder or by melt-kneaded by a kneader, or a bambury mixer and then granulated or palletized by an extruder. The granulated or palletized products are processed into film by a membrane forming machine or to fiber by a forming winder or processed into molded products by an injection molder according to the form of the final products.

EXAMPLE

The present invention is explained further in detail by way of Examples, but is not construed to limit the invention thereto.

Anti-oxidation property and initial color were evaluated according to the following method.

Anti-oxidation property:

A polypropylene sheet processed into a size of 40 mm×40 mm×1 mm was preserved at 140° C. in a gear-oven, and elapsed time until 30% of the polypropylene embrittled was measured.

Initial Color:

Yellowness index YI value of the surface of a polypropylene sheet processed into a size of 40 mm×60 mm×1 mm was measured by Color-computer.

In the following Examples following compounds are used.
A1: 2,5-Dimethyl-2,5-bis(t-butylperoxy)hexane
B1: Homo-polypropylene
C1: 6-[3-(3-t-Butyl-4-hydroxy-5-methylphenyl)propoxy]-2,4,8,10-tetra-t-butyldibenz[d,f][1,3,2]dioxaphosphepin
D1: Tris(2,4-di-t-butylphenyl) phosphite
P1: tetrakis (2,4-di-t-butylphenyl)-4,4'-biphenylenediphosphonite Example 1

Preparation of Polypropylene Sheet 100 parts by weight of polypropylene homopolyer with MI: 20, B1, described above, 0.05 part by weight of calcium stearate, 0.025 part by weight of C1, 0.10 part by weight of D1, and 0.4 part by weight of polypropylene homopolymer containing impregnated A1 at a concentration of 8%, which is equal to 0.032 part in terms of A1 were dry-blended, and the resulting mixture was heated and melt-kneaded with a 30 mmφ mono-axis extruder at 250° C. to produce pellets, which was then processed into a sheet of 40 mm×60 mm×1 mm by an injection-molder.

Examples 2 to 6

Polypropylene sheets with various contents of the components listed in Table 1 were prepared in a similar manner as in Example 1.

Comparative Example I

Polypropylene sheets were prepared in a similar manner as in Example 1 except without using the phosphorous type antioxidant D1.

Comparative Example II

Polypropylene sheets were prepared in a similar manner as in Example 1 except using tetrakis(2,4-di-t-butylphenyl)-4,4'-biphenylene-di-phosphonite in place of the phosphorous type antioxidant D1.

TABLE 1

| Example | Amount of C1(%) | Amount of D1 or P1(%) | Amount of A1(%) | Anti-oxidation Property (hr) | YI Value |
|---|---|---|---|---|---|
| 1 | 0.025 | D1: 0.10 | 0.032 | 470 | 3.50 |
| 2 | 0.04 | D1: 0.08 | 0.032 | 519 | 3.61 |
| 3 | 0.06 | D1: 0.06 | 0.032 | 626 | 3.56 |
| 4 | 0.08 | D1: 0.04 | 0.032 | 716 | 3.64 |
| 5 | 0.10 | D1: 0.02 | 0.032 | 876 | 3.68 |
| 6 | 0.06 | D1: 0.06 | 0.020 | 750 | 3.29 |
| I | 0.12 | None | 0.032 | 1051 | 3.74 |
| II | 0.025 | P1: 0.10 | 0.032 | 401 | 3.75 |

The invention claimed is:

1. A polyolefin resin composition, comprising
(A) an organic peroxide,
(B) tris(2,4-di-t-butylphenyl)phosphite
(C) 6-[3-(3-t-butyl-4-hydroxy-5-methylphenyl)propoxy]-2,4,8,10-tetra-t-butyldibenz[d,f][1,3,2]dioxaphosphepin, and
(D) polyproplyene homopolymer,
and wherein the amount of (B) tris(2,4-di-t-butylphenyl) phosphite is 0.06 to 0.10 parts per 100 parts by weight of the total amount of (A) and (D) and the amount of (C) 6-[3-(3-t-butyl-4-hydroxy-5-methylphenyl)propoxy]-2,4,8,10-tetra-t-butyldibenz[d,f][1,3,2]dioxaphosphepin 0.025 to 0.06 parts per 100 parts by weight of the total amount of (A) and (D).

2. A process for producing the polyolefin resin composition of claim 1, which comprises
mixing the tris(2,4-di-t-butylphenyl)phosphite, 6-[3-(3-t-butyl-4-hydroxy-5-methylphenyl)propoxy]-2,4,8,10-tetra-t-butyldibenz[d,f][1,3,2]dioxaphosphepin, the organic peroxide and the polypropylene homopolymer, wherein the amount of the tris(2,4-di-t-butylphenyl) phosphite is 0.06 to 0.10 parts per 100 parts by weight of the total amount of (A) and (D) and the amount of 6-[3-(3-t-butyl-4-hydroxy-5-methylphenyl)propoxy]-2,4,8,10-tetra-t-butyldibenz[d,f][1,3,2]dioxaphosphepin is 0.025 to 0.06 parts per 100 parts by weight of the to total amount of the organic peroxide and the polypropylene homopolymer, and
melt-kneading the resulting mixture.

* * * * *